United States Patent Office 2,993,863
Patented July 25, 1961

2,993,863
HALOGENATED PROPARGYL ALCOHOLS AS CORROSION INHIBITORS
Roger F. Monroe and Fred J. Lowes, Midland, Mich., and Gerald L. Foster and Billy D. Oakes, Tulsa, Okla., assignors to The Dow Chemical Company, Midland, Mich., a corporation of Delaware
No Drawing. Filed Aug. 2, 1956, Ser. No. 601,640
11 Claims. (Cl. 252—147)

This invention relates to corrosion inhibitors for use in aqueous hydrochloric acid to inhibit the corrosion of iron, steel, ferrous alloys or nickel exposed to such acid.

The new inhibitors are the halogenated propargyl alcohols corresponding to the formula

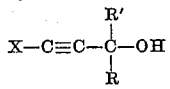

wherein X is a halogen with an atomic number of at least 17 and R and R' are each selected from the group consisting of hydrogen and lower alkyl groups.

According to the invention, the inhibitor is simply dissolved in the aqueous hydrochloric acid the corrosive action of which is to be inhibited. By "aqueous hydrochloric acid" we mean HCl in the presence of a significant amount of water and do not mean to exclude the presence of other substances.

Only a small amount of the inhibitor is required. As little as a few thousandths of 1 percent, based on the aqueous acid, significantly reduces the corrosion of iron, steel and nickel exposed to the acid. The degree of inhibition increases with the concentration of the inhibitor up to a level of about 1 percent, while beyond this point there is little advantage in using more inhibitor. For most applications we prefer to use the inhibitor at a level of about 0.1 to 0.4 percent, this being adequate for most purposes.

The inhibitors of the invention are effective not only at ordinary temperatures but also at elevated temperatures up to the decomposition point of the inhibitor. All are effective at 150° F. and some at 175°. They are effective in all concentrations of hydrochloric acid at least up to 37 percent, this corresponding to commercial concentrated acid.

Applications in which the inhibitors are particularly useful include metal-pickling, cleaning and polishing baths, oil well-acidizing solutions and boiler-cleaning compositions.

The following description of the preparation of 1-chloro-2-propyne-3-ol illustrates a general method for synthesizing the halogenated propargyl compounds.

For 3 hours chlorine was bubbled through a 40 percent aqueous solution of propargyl alcohol containing a molar equivalent of NaOH. The solution was then allowed to stand overnight, after which it was fractionally distilled. The fraction boiling in the range 60 to 70° C. was indicated by infra-red analysis to be 1-chloro-1-propyne-3-ol and was used without further treatment.

In order to demonstrate the effectiveness of our inhibitors, a series of tests was run in which 0.4 percent of the inhibitor was put into a 10 percent aqueous solution of hydrochloric acid held at 150° F. and a coupon of AISI-1020 mild steel, previously pickled, cleaned, dried and weighed, was suspended in the acid for 16 hours. The coupon was then washed, dried and reweighed to determine the amount of metal dissolved by the acid. This was calculated as pounds of metal removed per square foot of exposed surface per day. Results of these tests are shown in Table I.

Table I

Corrosion of mild steel by 10 percent HCl at 150° F. in the presence of 0.4 percent of an inhibitor having the formula

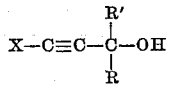

| Example No. | X | R | R' | Corrosion, lb./sq. ft./day |
|---|---|---|---|---|
| 1 | I | CH₃ | CH₃ | 0.0021 |
| 2 | Cl | H | H | .0030 |
| 3 | I | CH₃ | C₂H₅ | .0065 |
| 4 | Br | C₂H₅ | CH₃ | .019 |
| 5 | (¹) | (¹) | (¹) | >1 |

¹ No inhibitor.

Results generally paralleling those shown in Table I were obtained when similar tests were run at lower temperatures, with higher or lower concentrations of acid, or with other ferrous metals or nickel. The inhibitors of Examples 1 and 2 were also effective at higher temperatures up to at least 175° F. In general the upper temperature limit is somewhat dependent on the concentration of the acid used in the test, the more dilute the acid the higher the themperature limit of the inhibitor.

Homologs of the compounds in the above able wherein R and R' are lower alkyl groups are also effective inhibitors. By "lower alkyl" we mean groups containing up to about 6 carbon atoms.

We claim:
1. An aqueous solution of hydrochloric acid containing, as a corrosion inhibitor therefor, an effective amount of a compound having the formula

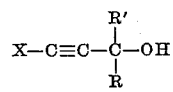

wherein X is a halogen with an atomic number of 17 to 53 and R and R' are each selected from the group consisting of hydrogen and alkyl groups containing one to six carbon atoms.
2. A solution as in claim 1 wherein X is chlorine.
3. A solution as in claim 1 wherein X is bromine.
4. A solution as in claim 1 wherein X is iodine.
5. A solution as in claim 1 wherein the inhibitor is 4-iodo-2-methyl-3-butyn-2-ol.
6. A solution as in claim 1 wherein the inhibitor is 3-chloro-2-propyn-1-ol.
7. A solution as in claim 1 wherein the inhibitor is 1-iodo-3-methyl-1-pentyn-3-ol.
8. A solution as in claim 1 wherein the inhibitor is 5-bromo-3-methyl-4-pentyn-3-ol.
9. A solution as in claim 1 wherein the concentration of the inhibitor is about 0.1 to 1 percent by weight.
10. A process for inhibiting the corrosion of a metal of the group consisting of iron, steel, nickel and ferrous alloys by aqueous hydrochloric acid in contact therewith comprising maintaining in said acid a small but effective concentration of a compound having the formula

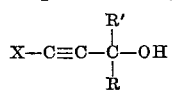

wherein X is a halogen with an atomic number of 17 to 53 and R and R' are each selected from the group consisting of hydrogen and alkyl groups containing one to six carbon atoms.
11. A process as defined in claim 10 wherein the concentration of inhibitor is about 0.1 to 1 percent by weight.

(References on following page)

References Cited in the file of this patent

UNITED STATES PATENTS

| Number | Name | Date |
|---|---|---|
| 1,169,341 | Chrzesciuski et al. | Jan. 25, 1916 |
| 1,841,768 | Strauss et al. | Jan. 19, 1932 |
| 1,963,934 | Carothers et al. | June 19, 1934 |
| 2,152,406 | Ducamp et al | Mar. 28, 1939 |
| 2,204,597 | Humphreys et al | June 18, 1940 |
| 2,250,445 | Bruson et al. | July 29, 1941 |
| 2,355,599 | Walker | Aug. 8, 1944 |
| 2,371,644 | Petering et al. | Mar. 20, 1945 |
| 2,407,149 | Gardenier | Sept. 3, 1946 |
| 2,603,622 | Berger et al. | July 15, 1952 |
| 2,726,269 | Humphlett | Dec. 6, 1955 |
| 2,775,624 | Skeeters et al. | Dec. 25, 1956 |
| 2,775,626 | Schaaf et al. | Dec. 25, 1956 |
| 2,805,257 | Lowes et al. | Sept. 3, 1957 |
| 2,806,067 | Monroe et al. | Sept. 10, 1957 |
| 2,814,593 | Beiswanger et al. | Nov. 26, 1957 |
| 2,838,458 | Bachtel | June 10, 1958 |
| 2,880,180 | Foster et al. | Mar. 31, 1959 |

FOREIGN PATENTS

| Number | Country | Date |
|---|---|---|
| 627,453 | Great Britain | Aug. 9, 1949 |
| 890,796 | Germany | Sept. 21, 1953 |
| 1,075,385 | France | Apr. 14, 1954 |
| 1,079,916 | France | May 26, 1954 |
| 505,421 | Belgium | Sept. 15, 1951 |

OTHER REFERENCES

Acetylenic Compounds by Johnson, vol. I, Acetylenic Alcohols, pp. 119, 276, 279, 281, 284, pub. by Edward Arnold & Co., London (1946).

Corrosion Handbook by Uhlig, pp. 910–912, pub. by John Wiley, N.Y. (1948).